Jan. 10, 1967 R. JAQUET 3,297,851
COMMUTATORS FOR MEASURING APPARATUS HAVING A LINEARLY MOVING NEEDLE
Filed June 25, 1965     3 Sheets-Sheet 1
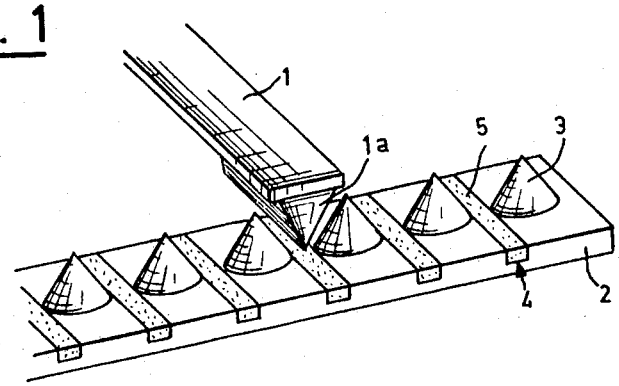
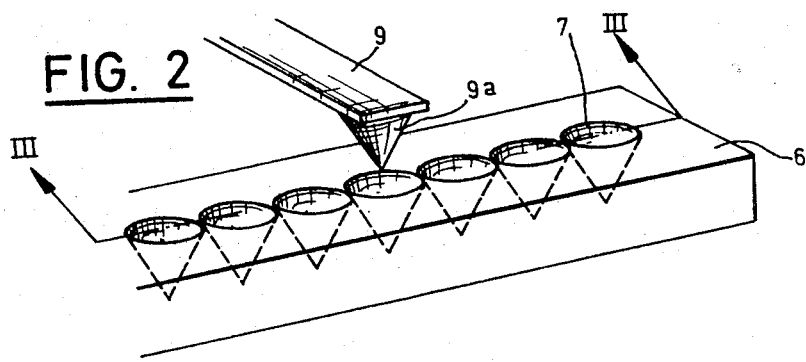
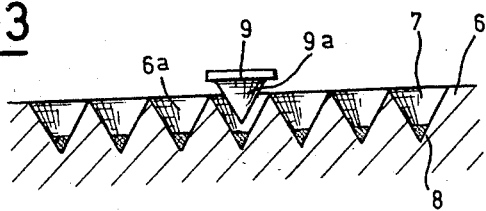

United States Patent Office 3,297,851
Patented Jan. 10, 1967

3,297,851
COMMUTATORS FOR MEASURING APPARATUS
HAVING A LINEARLY MOVING NEEDLE
Reynold Jaquet, Hoelstein, Basel, Switzerland, assignor to
Oris Watch Co. S.A., Hoelstein, Basel, Switzerland, a
corporation of Switzerland
Filed June 25, 1965, Ser. No. 467,015
Claims priority, application Switzerland, June 25, 1964,
8,329/64
18 Claims. (Cl. 200—166)

The present invention relates to commutators comprising at least one row of contacts and at least one arm which is movable laterally and is susceptible of being brought alternatively into cooperation with all of the contacts, characterized by the fact that it comprises in the space separating the contacts at least one abutment member of which at least a part of the exposed face is inclined in the direction of one or the other immediately adjacent contact and defining with each adjacent member the portion of the contact comprised between the two members with which the arm can cooperate and characterized by the fact that on the face facing the contacts, the arm has at least one guiding element forming a dihedral parallel to the longitudinal axis of the arm and by which the arm enters into contact with the said abutments in such manner that when the arm is applied by the element on the flank of one or the other abutment member, it slides on the flank and enters into contact with the contact situated opposite the said flank of the abutment member.

The accompanying drawings represent by way of example four embodiments of the present invention.

FIG. 1 is a side view perspective of the first embodiment of a commutator in accordance with the present invention.

FIG. 2 is a view similar to FIG. 1 of a second embodiment.

FIG. 3 is a section taken approximately along the line III—III in FIG. 2.

Figure 4:
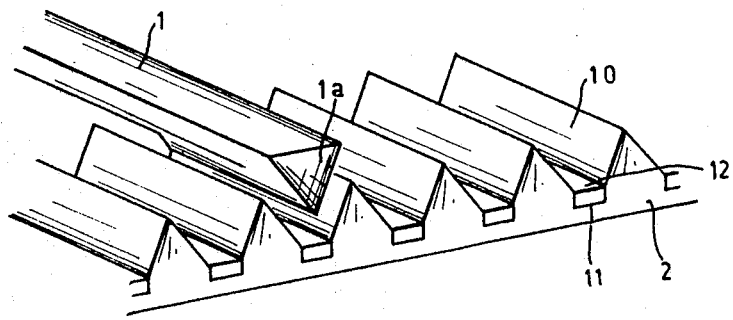
FIG. 4 is a perspective view of a third embodiment of the invention.

The commutator shown by way of example in FIG. 1 comprises an arm 1 pivotally mounted in such manner as to be able to swing horizontally above an insulating base plate 2, the upper face of which prevents a row of abutment points 3 which are conical and equidistant and between these points, grooves 4, the axis of symmetry of which passes through the axis of rotation of the arm 1. In these grooves, there are disposed small conductive plates or bars 5 forming conductive contacts with which a contact 1a on the arm 1 is adapted to cooperate.

The points 3 can be made integral with the plate 2 or can be independent and fixed on the plate 2 by any suitable means. In the latter case, they can be of plastic or metallic material.

The contact bars 5 can, for example, be preformed and pressed into the grooves 4 of the plate 2 or when the thickness of the plate is particularly small, they can constitute printed circuit elements on the plate.

The arm 1 and the contact 1a are metallic. They can be a single piece or, on the contrary, can be formed as two distinctive pieces united by suitable means. The contact 1a has a cross section of triangular form, the angle of which is the same as the angle which is formed by the conical points 3. Its length is approximately equal to that of the contact plates 5.

The spacing of the points 3 measured at their base is equal to the width of the contact plate 5. In this manner, whenever the contact 1a associated with the arm 1 is applied on the flank of one of the points 3 by displacement or flexion of the arm 1 in the direction of the contact plates, the contact slides on the point and engages the bar 5 situated adjacent the side of the ridge which has deflected the contact 1a.

The commutator apparatus in accordance with the invention can be associated with all measuring apparatus of which the measured value is converted into a corresponding displacement of an axis carrying an indicating needle which is the case for example for voltmeters, ammeters, comparators, tachometers, etc.

The angular space normally swept by the needle is best divided into as many increment spaces as there are contact plates 5 and each of the plates is assigned a value corresponding for example to the mean value of the respective fractional space. Each contact plate can, for example, be connected by a corresponding connection to electrically controlled apparatus to which it is desired to communicate the results of the measurement effected. During the measurement, the arm 1 is maintained above a plane passing through the peaks of the respective points and is only pressed in the direction of plate 2 by suitable means when this measurement has been completed. The arm 1 can be mounted on a telescopic axis and can be subjected to the pull-back spring tending to maintain it in a raised position. Alternatively, it can be formed as an elastic lamina in whole or in part extending normally above the points 3 and brought into cooperation with one of the other of the points by flexing. Of course, the arm is articulated in a plane parallel to the plate 2 and is symmetrically fixed to the axis to which is fixed the indicating needle of the measuring apparatus.

In a variation not shown, the contact plates 5 can for example be replaced by contacts of circular form and the points may be disposed on opposite sides of the line of contacts, each point being, of course, disposed between two successive contacts and along two distinct lines.

In a second embodiment of the invention as illustrated in FIG. 2, an insulating plate 6 is provided in its upper face with a series of adjacent recesses or openings 7 of conical form of which the bottom is filled with a conductive mass 8 (FIG. 3) constituting the contacts with which a contact 9a carried at the end of an arm 9 can cooperate.

The contact 9a is formed by a conical point of an electrically conductive material of which the angle at the apex is at least equal to the angles formed by the diametrically opposite sides of each of the openings 7.

The position of the point 9a is such that when the arm 9 is displaced transversely, it defines a line cutting the point of contact of the bottom of each of the recesses 7 with the bottom of the immediately adjacent recess.

The operation of the apparatus shown in FIGS. 2 and 3 is in every way identical with that of the apparatus shown in FIG. 1. The extremity of the contact 9a coming into contact with the face of one or the other of the recesses 7 when the arm 9 has been positioned above one of the recesses, for example when it is associated with a measuring instrument by being displaced in the direction of the plate 6.

In the embodiment of FIG. 4, the points 3 of FIG. 1 are replaced by studs 10 of parallelpiped form and of triangular cross section corresponding to that of the contact 1a of the arm 1. These studs are integral with the plate 2 and can be obtained either by machining the plate or by injection molding with the plate itself when this plate is of plastic material. Between each stud 10, there is provided a groove 11 for the contact lamina 12.

Figure 5:
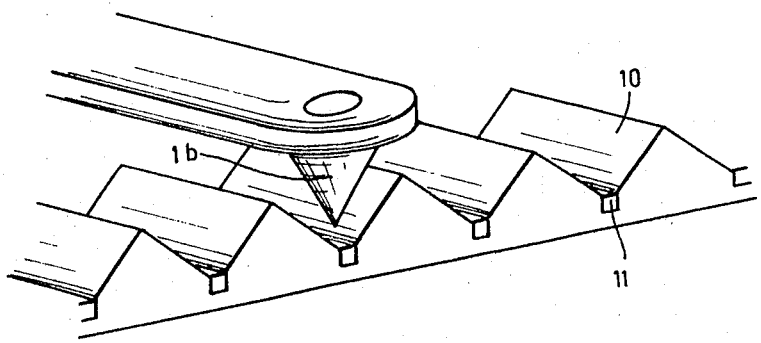
FIG. 5 is a view similar to FIG. 4 showing a variant of the third embodiment.

In the variation shown in FIG. 5, the parallelepiped contact stud 1a of FIGS. 1 and 4 is replaced by a conical stud 1b similar to that of the embodiment of FIG. 2.

Figure 6:
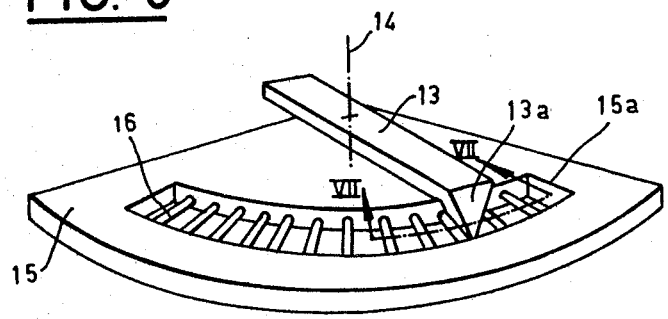
FIG. 6 is a perspective view of a fourth form of the invention.

In the embodiment of FIG. 6, the apparatus comprises as in the preceding forms, a commutation arm 13 pivotally mounted on the axis 14 and of which the extremity forms a stud 13a. The axis 14 is slidably mounted in a guide member (not shown) and can be displaced downwardly against the action of a spring (not shown).

Figure 7:
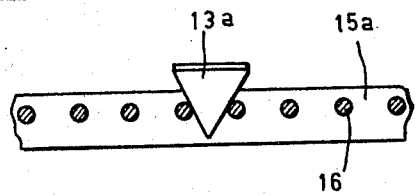
FIG. 7 is a detailed section taken approximately along the line VII—VII in FIG. 6.

Below the arm 13 and parallel to its plane of articulation, the apparatus comprises an insulating plate 15 provided with an arcuate window 15a, the radius of which is concentric with the axis 14. In the opening of this window, there are disposed a series of metallic bars 16 which are equidistant and are directed toward the axis 14. Each of these bars 16 constitutes an electrical contact and the arm 13 can cooperate simultaneously with two adjacent bars by its pyramidal stud 13a as seen in FIG. 7 upon axial displacement of the axis 14. Each of the contact bars 17 can, for example, correspond to a determined value different for each of the two and straddling for example the value represented by displacement if the arm from the left to right of the drawing. In this case, the arm 13 which will touch two adjacent contacts permits the determination of the value by means of the bars with which it cooperates.

Figure 8:
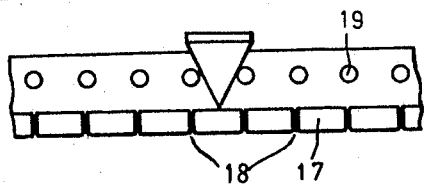
FIG. 8 is a view similar to FIG. 7 showing a modification.

In the variation shown in FIG. 6, the bars 16 assume only the function analogous to that of points 3 of the embodiment of FIG. 1 for example. Between adjacent bars, there are disclosed contact points 17, insulated electrically from one another by insulating spaces 18. As represented in FIG. 8, the arm 13 cooperates with the contacts 17 by the lower points of its contact stud 13a.

The bars 16 are preferably of circular cross section but can alternatively be of elliptical, quadrangular or triangular cross section.

Figure 9:
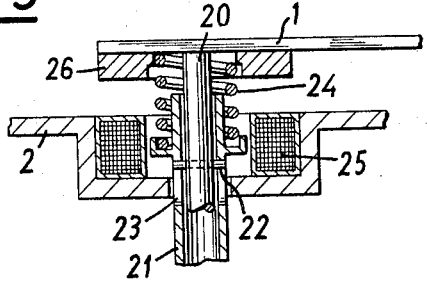
FIG. 9 is a schematic sectional view illustrating pivotal mounting of the arm.

In FIG. 9 of the drawing there is illustrated a schematic figure, an example of pivotal mounting of the arm carrying the movable contacts. As illustrated in this figure the arm 1 is fixed on its subshaft 20 which is slidable in a hollow shaft 21, representing for example the indicating shaft of an instrument.

A pin 22 extending diametrically through a lower end portion of the inner shaft 20 has ends projecting into diametrical slots 23 and the hollow shaft 21 to limit the axial movement of the inner shaft relative to the outer shaft and also to cause the two shafts to turn together.

A light compression spring 24 acts upwardly on the arm 1 so as to maintain it normally in an upper position in which the contacts 1a carried by the arm is above the abutments on the base plate 2.

Suitable mechanical electromagnetic or other means is provided for moving the arm downwardly against the spring.

By way of example such means is illustrated as a solenoid 25 which surrounds the shafts 20 and 21 and is adapted to act on an angular armature 26 which surrounds the subshaft 20 and is affixed to the arm 1.

When the solenoid 25 is energized the arm 1 is moved downwardly against the bias of spring 24 so as to bring the movable contact carried by the arm into engagement with one or another of the base contacts 5, 8, etc. carried by the base.

It will be understood that the several features of the embodiments illustrated and described are mutually interchangeable is so far as they are compatible and that other modifications may be made without departing from the spirit of the invention.

It will be noted that the points 1a and 3 as well as the recesses 7 can have forms different from those illustrated. For example, these points or recesses can be pyramidal or can have convex or concave lateral surfaces. Finally, it is evident that the commutator arm of the apparatus can be of the type which is displaceable laterally parallel to itself notably when it is intended to be associated with measuring apparatus of which the needle moves linearly over a rectangular dial.

What I claim is:

1. Commutator apparatus comprising at least one row of spaced abutments having inclined side surfaces and defining spaces between said abutments, an arm movable transversely and vertically of said row of abutments, a contact member carried by said arm in position to move along said row of abutments when said arm is moved transversely of said row, said contact member being further movable toward and away from said abutments between a free position in which it is clear of said abutments and an engaged position between two adjacent abutments, said contact member having inclined faces defining a dihedral angle and engageable with an underlying said abutment when said contact member is moved from said free position to said engaged position to position said contact member between two abutments and cooperating contact means engaged by said contact member when in said engaged position.

2. Apparatus according to claim 1, in which said abutments comprise spaced points projecting up from a base.

3. Apparatus according to claim 2, in which said points are pyramidal.

4. Apparatus according to claim 2, in which said points are conical.

5. Apparatus according to claim 1, in which said abutments have convex lateral surfaces.

6. Apparatus according to claim 1, in which said abutments project up from a base of insulating material and are integral with said base.

7. Apparatus according to claim 1, in which said abutments are carried by a base and in which said arm is pivotally mounted on said base.

8. Apparatus according to claim 7, in which said abutments comprise parallelepiped projections on said base each having inclined lateral sides defining a dihedral of which the crest is directed toward the pivot axis of said arm.

9. Apparatus according to claim 7, in which said abutments comprise spaced bars extending in a lengthwise direction toward the pivot axis of said arm and disposed on a plane perpendicular to said axis.

10. Apparatus according to claim 9, in which said contact means comprise contacts disposed between said bars and below the plane of said bars.

11. Apparatus according to claim 7, in which the pivotal mounting of said arms comprises a telescopic pivot shaft permitting limited movement of said arm toward and away from said base.

12. Apparatus according to claim 11, in which resilient means is provided for biasing said arm to said free position.

13. Apparatus according to claim 12, further comprising means for moving against said bias from said free position to said engaged position.

14. Apparatus according to claim 1, in which said contact means comprises lamellae of conductive material disposed between said spaced abutments.

15. Apparatus according to claim 1, in which said contact member comprises a member of inverted parallelepiped shape on the lower side of said arm and having an apex extending lengthwise of said arm.

16. Commutator apparatus comprising a base, an arm pivotally mounted on said base to moving about an axis and in a plane parallel to said base, first contact means on the lower side of said arm and having inclined sides converging downwardly toward one another, said first contact means being carried by said arm in an arc of travel concentric with said pivot axis, a plurality of spaced abutments on said base and disposed in an arcuate row underlying and concentric with said arc of travel of said first contact means, said first contact means being movable in a direction toward and away from said base between a free position in which it is above said abutments and an engaged position in which said first contact means is between two adjacent abutments and being engageable with at least one said abutment when moving from said free position to said engaged position to position said first contact means between adjacent abutments, second contact means carried by said base and engageable by said first contact means when in said engaged position, means for biasing said first contact means toward said free position and means for moving said first contact means against said bias from said free position to said engaged position.

17. Commutator apparatus comprising at least one row of spaced abutments having inclined surfaces and defining spaces between said abutments, an arm movable transversely of said row of abutments, a contact member carried by said arm in position to move along said row of abutments when said arm is moved transversely of said row, said contact member being freely movable toward and away from said abutments between a free position in which it is clear from said abutments and engaged position between two adjacent abutments, said contact member having inclined faces defining a dihedral angle and engageable with an underlying said abutment when said contact member is moved from said free position to said engaged position to position such contact member between two abutments and cooperating contact means engaged by said contact member when in said engaged position; said abutments being carried by a base, said arm being pivotally mounted on said base, said abutments comprising parallelepiped projections on said base, each having inclined lateral faces defining a dihedral of which the crest is directed toward the pivoting axis of said arm, said abutment further comprising spaced bars extending in a lengthwise direction towards said pivoting axis of said arm and disposed on a plane perpendicular to said axis, said bars being at least partly of electrically conductive material and constituting said contact means.

18. Commutator apparatus comprising at least one row of spaced abutments having inclined side surfaces and defining spaces between said abutments, an arm movable transversely and vertically of said row of abutments, a contact member carried by said arm in position to move along said row of abutments when said arm is moved transversely of said row, said contact member being further movable toward and away from said abutments between a free position in which it is clear of said abutments and an engaged position between two adjacent abutments, said contact member having inclined faces defining a dihedral angle and engageable with an underlying said abutment when said contact member is moved from said free position to said engaged position to position said contact member between two abutments and cooperating contact means engaged by said contact member when in said engaged position, in which said abutments are formed by recesses in a base of insulating material and said contact means comprise contacts in the bottoms of said recesses.

References Cited by the Examiner
UNITED STATES PATENTS
1,119,374  12/1961  Schlenz _____ 200—166

ROBERT K. SCHAEFER, *Primary Examiner.*

H. O. JONES, *Assistant Examiner.*